United States Patent [19]

Roth et al.

[11] Patent Number: 4,832,568
[45] Date of Patent: May 23, 1989

[54] TURBOMACHINE AIRFOIL MOUNTING ASSEMBLY

[75] Inventors: Robert H. Roth; Bruno G. Lampsat, both of Cincinnati, Ohio; Jack L. Readnour, Ft. Mitchell, Ky.

[73] Assignee: General Electric Company, Cincinnati, Ohio

[21] Appl. No.: 540,714

[22] Filed: Oct. 13, 1983

Related U.S. Application Data

[63] Continuation of Ser. No. 353,112, Feb. 26, 1982, abandoned.

[51] Int. Cl.⁴ .............................................. F01D 5/10
[52] U.S. Cl. ..................................... 415/189; 416/500
[58] Field of Search ........................... 415/137–139, 415/189–191, 185, 210, 216–218; 416/189, 500

[56] References Cited

U.S. PATENT DOCUMENTS

| | | | |
|---|---|---|---|
| 2,637,488 | 5/1953 | Krouse et al. | 415/190 |
| 2,779,565 | 1/1957 | Buckmann | 415/200 |
| 2,834,537 | 5/1958 | Neary . | |
| 2,924,425 | 2/1960 | Cutler . | |
| 2,995,294 | 8/1961 | Warnken | 415/217 UX |
| 2,997,275 | 10/1961 | Bean et al. | 415/135 |
| 3,095,138 | 6/1963 | Warnken . | |
| 3,104,091 | 9/1963 | Vivian . | |
| 3,319,930 | 5/1967 | Howald . | |
| 3,442,442 | 5/1969 | Seiwert . | |
| 3,556,675 | 1/1971 | Howald et al. . | |
| 3,588,267 | 6/1971 | Wilkinson | 415/216 X |
| 3,857,649 | 12/1974 | Schaller et al. | 415/200 |
| 3,892,497 | 7/1975 | Gunderlock et al. . | |
| 3,910,716 | 10/1975 | Roughgarden et al. | 415/217 |
| 3,932,056 | 1/1976 | Tai . | |
| 4,028,006 | 6/1977 | Kuroda et al. | 416/191 |
| 4,142,827 | 3/1979 | Vinciguerra . | |
| 4,305,696 | 12/1981 | Pask | 415/217 |
| 4,378,961 | 4/1983 | Trousdell | 415/137 |

FOREIGN PATENT DOCUMENTS

| | | | |
|---|---|---|---|
| 1374917 | 8/1964 | France | 416/500 |
| 68609 | 6/1977 | Japan | 415/189 |

Primary Examiner—Robert E. Garrett
Assistant Examiner—Joseph M. Pitko
Attorney, Agent, or Firm—Derek P. Lawrence

[57] ABSTRACT

An assembly for mounting a plurality of circumferentially spaced and radially extending airfoils. In a preferred embodiment the assembly comprises a plurality of arcuate mounting fairings each including a central boss having at least one radially extending recess disposed in a radially inner surface thereof which contains an elastomeric boot for receiving an end of one of the plurality of airfoils. The mounting fairing further includes integral first and second flanges extending circumferentially outwardly from opposite sides of the boss portion which overlap complementary second and first flanges, respectively, of adjacent mounting fairings. Fastening means connect the first and second flanges of adjacent mounting fairings to form a continuous annular shroud.

9 Claims, 1 Drawing Sheet

U.S. Patent  May 23, 1989  4,832,568
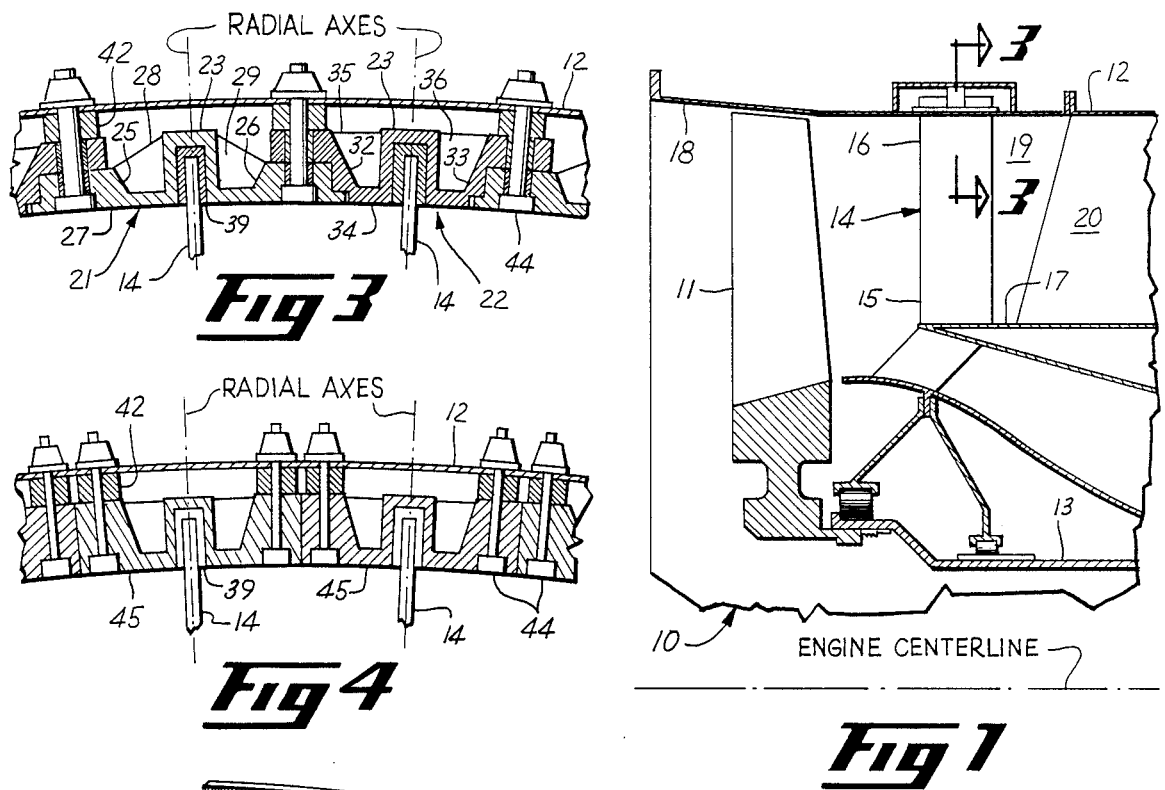
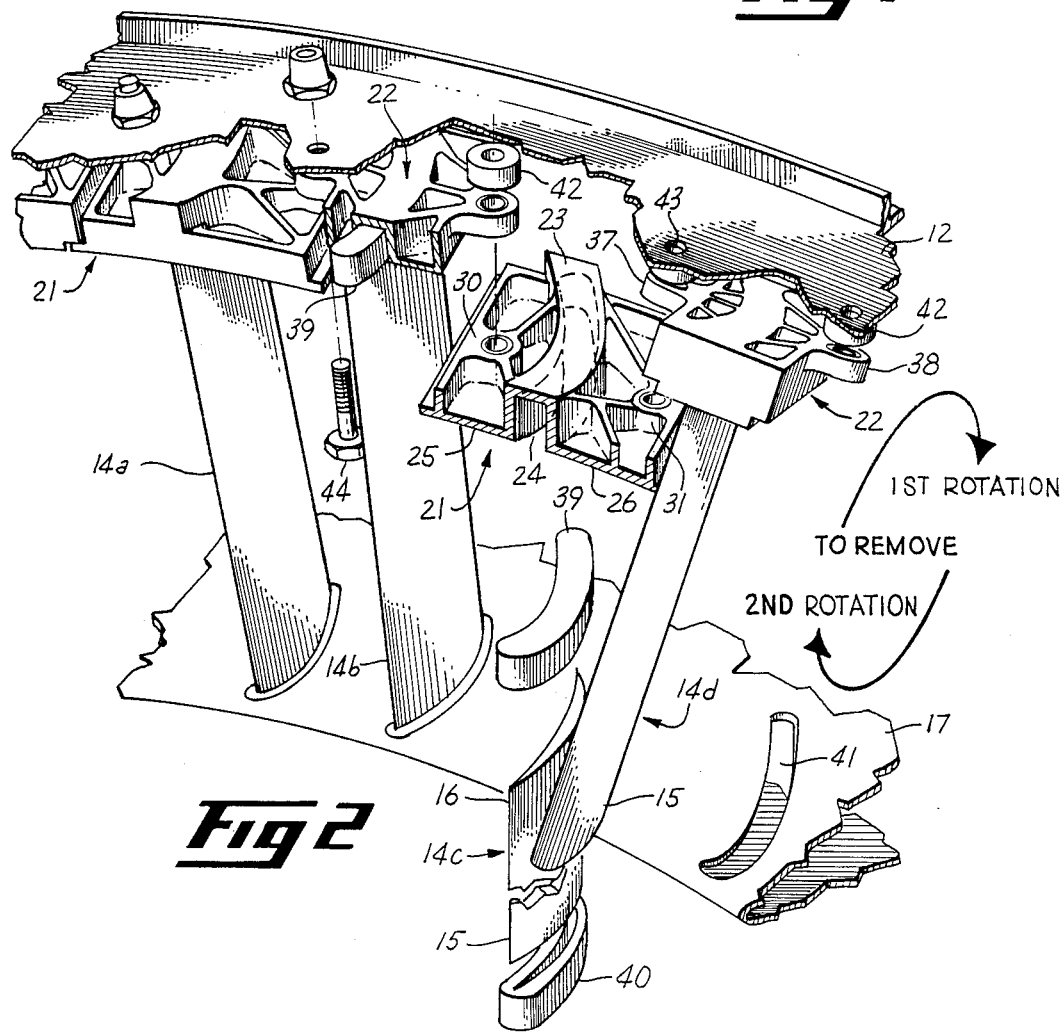

TURBOMACHINE AIRFOIL MOUNTING ASSEMBLY

This application is a continuation of application Ser. No. 353,112 filed 2/26/82.

BACKGROUND OF THE INVENTION

This invention relates to turbomachines and more particularly to an airfoil mounting assembly in a gas turbine engine.

While not limited thereto, this invention has particular utility when utilized in conjunction with a gas turbine engine having airfoils such as fan outlet guide vanes and stator vanes. Stator vanes, for example, each can typically include an integral mounting platform at the radially outer end thereof which is fastened to a cylindrical stator casing by retaining rings or by a plurality of mounting bolts. The vanes can have root portions of complex shapes such as the fir tree or dovetail type, which fit complementarily shaped slots in an inner stator supporting ring. Vanes having integral platforms and specifically shaped roots have been considered essential in the prior art to insure accurate alignment and positive retention of the vanes in the stator casing.

Furthermore, modern aircraft turbine engines are becoming shorter in length which requires closer spacing of the fan blades, stator vanes, and frame components. The resulting close proximity of and resulting aerodynamic interaction between the fan blades, stator vanes such as outlet guide vanes and the fan frame requires more than one type of vane in each vane row for achieving desired airflow thereacross. For example, individual vanes of the outlet guide vane row can include various airfoil cross-sections, and pitch, i.e., different airfoil angles of orientation with respect to the turbine radial axis for increasing aerodynamic performance.

The use of non-uniform type airfoils as above described in a turbomachine and the close proximity thereof to adjacent engine components has required a generally more complex mounting assembly in order to provide for the installation and removal of individual airfoils. Such a mounting assembly can include many parts and require accurate manufacturing, and thereby increase the complexity and cost of manufacture and assembly. For example, in order to reduce weight, the mounting members of the assembly are constructed relatively small and additional intravane fairing members are located between adjacent airfoil ends for providing a substantially uninterrupted outer flowpath surface for allowing the smooth flow of gases.

Additionally, turbomachine airfoils are subject to forced excitation at their natural frequencies of vibration which can result in undesirably high airfoil stresses. The stresses are more of a concern when the airfoil members are formed of composite materials. More specifically, the unidirectional strength characteristics of the filaments in an airfoil formed of composite materials adds to the complexity in providing conventional integral shrouds, either at the ends or at part span to mount the airfoil and to accommodate airfoil vibration as has been done with homogeneous metal airfoils.

SUMMARY OF THE INVENTION

Accordingly, it is an object of the present invention to provide a new and improved assembly for mounting airfoils in accurate alignment and with positive retention in a turbomachine.

Another object of the present invention is to provide an airfoil mounting assembly for mounting airfoils formed of composite materials.

Another object of the present invention is to provide an airfoil mounting assembly which allows the selective installation and removal of individual airfoils.

Another object of the present invention is to provide an airfoil mounting assembly which resiliently supports, and dampens vibration of, airfoils.

Another object of the present invention is to provide an airfoil mounting assembly which comprises a plurality of combination mounting and intravane fairing members defining a shroud having a substantially uninterrupted flow boundary surface for allowing the smooth flow of gases.

Another object of the present invention is to provide an airfoil mounting assembly which is lightweight and has few parts.

According to one embodiment of the present invention there is provided an assembly for mounting the ends of a plurality of circumferentially spaced and radially extending airfoils comprising a plurality of mounting fairings which receive and support the ends of the airfoils. Each mounting fairing includes a central boss portion having at least one radially extending recess disposed in a radially facing surface thereof which can contain an elastomeric boot for receiving an end of one of the plurality of airfoils. The mounting fairing further includes integral first and second flanges extending circumferentially outwardly from opposite sides of the boss portion and disposed adjacently to second and first flanges, respectively, of adjacent mounting fairings. Fastening means connect the first and second flanges of adjacent mounting fairings to form a substantially continuous annular shroud.

DESCRIPTION OF THE DRAWING

FIG. 1 is a fragmentary, sectional view of a fan assembly and outlet guide vane portion of a gas turbine engine incorporating the present invention.

FIG. 2 is a fragmentary, projected view of an airfoil mounting assembly constructed in accordance with one embodiment of the present invention.

FIG. 3 is a fragmentary, sectional view taken substantially along the line 3—3 of FIG. 1.

FIG. 4 is a fragmentary, sectional view taken substantially along the line 3—3 of FUGURE 1 and illustrating an airfoil mounting assembly constructed in accordance with another embodiment of the present invention.

DETAILED DESCRIPTION

Illustrated in FIG. 1 is a fan assembly region of an axial-flow, high-bypass gas turbine engine 10. The gas turbine, or turbofan, engine 10 includes a fan assembly enclosed within a substantially cylindrical stator outer casing 12. The fan assembly comprises a fan blade row including a plurality of circumferentially spaced and radially extending fan blades 11. The radially inner ends of the fan blades 11 are suitably connected to a rotatable shaft 13.

Disposed downstream of the plurality of fan blades 11 is an outlet guide vane row including a plurality of circumferentially spaced and radially extending outlet guide vanes 14. Although the vanes 14 can be made of aluminum and other metals, lightweight, high strength composite materials are preferred. More specifically, the composite materials can comprise high strength filaments, for example, boron or graphite filaments embedded in a homogeneous matrix, such as a plastic resin.

Each outlet guide vane 14 includes a radially inner end, or tip portion, 15 and a radially outer end, or root portion, 16. Although the outlet guide vanes 14 may include tip portions 15 and root portions 16 of complex shapes as found in the prior art, an improved airfoil mounting assembly according to one embodiment of the present invention includes plain ended vanes 14.

More specifically, each vane 14 comprises an elongate airfoil member having simply shaped, preferably airfoil shaped, tip and root portions 15 and 16 respectively, as shown more particularly on vane 14c of FIG. 2. Alternatively, and for example the tip portion 15 and root portion 16 can comprise other shapes such as rectangular. The tips 15 and roots 16 of vanes 14 are resiliently mounted to the inner surface of the stator casing 12 and an inner supporting shroud 17, respectively, suitably affixed in the engine 10 in a manner to be described below.

The stator casing 12 comprises an upstream end defining an annular fan inlet 18 and an intermediate section coaxially spaced about the inner shroud 17 and jointly cooperating therewith for defining an annular bypass duct or passageway 19. Disposed in bypass duct 19 and attached to stator casing 12 and inner shroud 17 are a plurality of circumferentially spaced strut or frame members 20.

In operation, ambient air is drawn through fan inlet 18 of the upstream end of the stator casing 12 and is accelerated by the fan blades 11, a portion of which air flows between and around outlet guide vanes 14 and through bypass duct 19. For increasing aerodynamic performance of the air passing through bypass duct 19 the outlet guide vanes 14 are disposed at non-uniform angular orientations with respect to each other.

More specifically, the angular orientation of the vanes 14 with respect to respective engine radial axes extending therethrough and to the airflow streamlines of the fan air flowing through bypass duct 19 can vary from vane to vane. Without the benefit of the present invention such non-uniformity of angular orientation of vanes 14 requires a non-uniform mounting assembly for each vane 14.

Furthermore, it is desirable that each vane 14 be easily and selectively installable in and removable from its position between the stator casing 12 and the inner shroud 17. The relatively close proximity of the fan blades 11, outlet guide vanes 14, and frame members 20 provides little area for maneuvering the vanes into and out of position and accordingly adds to the difficulty in providing such an accessible vane arrangement.

According to the present invention there is provided an airfoil mounting assembly which satisfies the above requirements as well as provides additional benefits from the use thereof as described below.

FIGS. 2 and 3 illustrate in more detail an airfoil mounting assembly according to one embodiment of the present invention. An airfoil mounting assembly including a plurality of arcuate mounting fairings disposed circumferentially adjacently to each other, connects adjacent outlet guide vanes 14 and stator casing 12.

More specifically, the mounting fairings can comprise and be arranged in complementary pairs including a first, radially inner, mounting fairing 21 and a second, radially outer, mounting fairing 22. The mounting fairings 21 and 22 each includes a central boss 23 having oppositely, radially extending first and second ends and at least one elongate recess 24 disposed in the first, radially inner end. The recess 24 preferably extends substantially radially, i.e., perpendicularly inwardly from the lower or inner surface of the boss 23 and substantially parallel to an engine radial axis. The recess 24, as most particularly shown in conjunction with the mounting fairing 21 of vane 14c extends longitudinally in boss 23, and generally parallel to the engine longitudinal centerline, and defines a well corresponding generally to the cross-sectional configuration of an airfoil for receiving the root 16 of vane 14c.

The first mounting fairing 21 further includes first and second ledges or flanges 25 and 26, respectively, which extend circumferentially outwardly from opposite sides of substantially the radially inwardly facing or lower portion of the boss 23. The flanges 25 and 26 and the boss 23 generally define an inverted T-like lateral profile when viewed along the engine longitudinal centerline, with each flange 25 and 26 defining one element of a lap joint pair. The first flange 25, the second flange 26 and the boss 23 cooperate to define a preferably arcuate mounting fairing having a continuous, concave, radially inwardly facing lower or inner surface 27. However, a suitable non-arcuate mounting fairing could be used.

Flanges 25 and 26 of the mounting fairing 21 are relatively thin in the radial or transverse dimension for reducing mounting fairing weight. In order to provide adequate structural strength, a plurality of integral, reinforcing gussets 28 extend from the upper surfaces of the first and second flanges 25 and 26 and from the sides of boss 23. The gussets 28 define therebetween a plurality of substantially triangular, weight-reducing pockets 29.

Symmetrically disposed on opposite sides of the boss 23 and integral with the first and second flanges 25 and 26 are fastening bosses 30 and 31, respectively, for receiving mounting bolts. The fastening bosses 30 and 31 have transversely or radially extending apertures therein, which can contain suitable bushings and which recessively receive mounting bolts. The apertures in the bosses 30 and 31 have axes which along with the radial axis of the recess 24 preferably intersect at substantially a common point along the engine longitudinal centerline. The fastening bosses 30 and 31 are transversely disposed in the flanges 25 and 26 and can extend upwardly from the lower surface 27 of the first mounting fairing 21 approximately one-half the transverse thickness of boss 23 as shown more particularly in FIG. 3.

The second mounting fairing 22 is generally similar in construction to that of the first mounting fairing 21. However, it includes first and second ledges or flanges 32 and 33, respectively, which extend circumferentially outwardly from opposite sides of substantially the radially outwardly facing or upper portion of the boss 23 thereof. The first and second flanges 32 and 33 and the boss 23 generally define a T-like lateral profile when viewed along the engine longitudinal centerline. Each first and second flange 32 and 33 of the second mounting fairings 22 overlaps radially the second and first flanges 26 and 25, respectively, of adjacent first mounting fairings 21 and defines the second element of the lap joint pair.

The first flange 32, the second flange 33 and the boss 23 cooperate to define a preferably arcuate mounting fairing having a concave, radially inwardly facing inner or lower surface 34. However, a suitable non-arcuate mounting fairing could be used. Flanges 32 and 33 also are relatively thin in the radial or transverse dimension for reducing the mounting fairing weight. A plurality of integral reinforcing gussets 35 extend from the upper surfaces of the first and second flanges 32 and 33 and from the sides of boss 23. The gussets 35 define therebetween a plurality of substantially triangular weight-reducing pockets 36.

Symmetrically disposed on opposite sides of the boss 23 and integral with the first and second flanges 32 and 33 are fastening bosses 37 and 38, respectively for receiving mounting bolts. The fastening bosses 37 and 38 have transversely or radially extending apertures therein, which also can contain suitable bushings for receiving mounting bolts and have axes which along with the radial axis of the recess 24 preferably intersect at substantially a common point along the engine longutidinal centerline. The fastening bosses 37 and 38 are transversely disposed in the flanges 32 and 33 and can extend downwardly from the upper or radially outer surface of the second mounting fairing 22 approximately one-half the transverse thickness of boss 23 thereof as shown more particularly in FIG. 3.

Although the roots 16 of vanes 14 can be rigidly secured directly in the recesses 24 of the mounting fairings 21 and 22, it is preferred that the mounting fairings 21 and 22 further comprise elastomeric receiving means such as an elastomeric boot, or closed bottom insert, 39 in the recesses 24 for resiliently supporting the roots 16 of the vanes 14. In this manner, the mounting fairings can be designed structurally rigid to withstand any resulting loads acting thereon from the vanes 14; with the elastomeric boot 39 providing for a structurally soft, resilient mount which can additionally dampen any vibrations of the vanes 14.

Suitable materials for the boots 39 can include, for example, polyester urethane. However, a fluoroelastomer such as is sold under the trademark Viton (E.I. duPont de Nemours & Co.) is preferred because its material properties do not appreciably lessen at the elevated temperatures experienced during operation.

The mounting fairings 21 and 22 can be made of metals such as aluminum, or pressure molded using polysulfone, or polyamide-imide such as is sold under the trademark Torlon (Amoco Chemicals Corp.). However, a molded mounting fairing comprising chopped graphite-fiber reinforced nylon is preferred because it provides relatively high structural strength with reduced weight.

The bushings found in the fastening bosses 30, 31, 37 and 38 can comprise either structurally hard or soft materials for either rigidly or elastically supporting the mounting fairings 21 and 22, respectively. However, for mounting fairings 21 and 22 comprising non-metals such as chopped graphite-fiber reinforced nylon, a metal bushing, such as aluminum is preferred.

The recesses 24 can be made sufficiently large for accommodating a family of vane roots 16 having various cross-sections and angular orientations. In this manner, the first and second mounting fairings 21 and 22 can each be made to a uniform construction and only the boots 39 need be individually tailored to conform to the various vane roots 16. The boots 39 can be simply individually molded for accommodating the various roots 16 in the recesses 24 of the mounting fairings.

A respective mounting fairing 21 or 22, boot 39, and vane 14 comprise an assembly unit which can be assembled and an adhesive, such as epoxy, can be used for bonding the boot 39 to the root 16 of vane 14 and into recess 24. Alternatively, the root 16 of vane 14 can be positioned in the recess 24 of a respective mounting fairing 21 or 22 and the boot 39 can be molded and cured in place, with the boot 39 material acting as the adhesive for joining the boot to the root 16 of vane 14 and to the walls of the recess 24.

In order to assemble the outlet guide vanes 14 into the turbofan engine 10, the roots 16 of vanes 14 are assembled to respective first and second mounting fairings as above-described. As more particularly shown in FIG. 2 and in conjunction with vane 14c shown in an exploded view, a vane 14 having a first mounting fairing 21 secured thereto is positioned in the turbine 10 with the tip 15 placed in an elastomeric boot 40. The boot 40 is similar in construction and composition to boot 39 and includes a recess which is complementary shaped to and for tightly receiving tip 15. Each boot 40 is suitably secured in a respective one of a plurality of radially extending slots 41 in the inner shroud 17. A vane 14 with a second mounting fairing 22 secured to the root 16 thereof, vane 14d shown in an intermediate position between an installed and removed position, can then be positioned in the turbine 10 with the tip 15 positioned in a boot 40 (not shown) in the slot 41 in inner shroud 17.

As illustrated in FIGS. 2 and 3, tubular spacers 42 are positioned between the upper surface of the second mounting fairings 22 and the stator casing 12 and aligned with the apertures in fastening bosses 37 and 38 of the first and second flanges 32 and 33, respectively, and with apertures 43 which extend through stator casing 12, all of which elements and apertures are preferably aligned along respective common radial axes.

The first mounting fairings 21 are positioned against the inner surfaces of the second mounting fairings 22 such that the first and second flanges of adjacent mounting fairings overlap radially. More specifically, the outer surfaces of bosses 30 and 31 of the first mounting fairings 21 are placed against the inner surfaces of the second and first flanges 33 and 32 of the adjacent second mounting fairings 22, respectively, and define lap joints thereat.

Mounting bolts 44 extend through respective first and second flanges of adjacent mounting fairings and through spacers 42 and apertures 43 in stator casing 12 and are suitably secured, by a nut for example, to stator casing 12. The heads of the bolts 44 are suitably recessed in the inner surfaces of the bosses 30 and 31 of the first mounting fairings 21. Although each mounting fairing is held by two bolts, the bolts additionally support adjacent mounting fairings resulting in an efficient mounting assembly requiring effectively only one bolt per mounting fairing.

When the mounting fairings 21 and 22 are assembled to each other, the lap joint arrangement of the first and second flanges thereof are effective for providing a substantially continuous and segmented, cylindrical, outer shroud joining the vanes 14. Furthermore, the inner surfaces 27 and 34 of the first and second mounting fairings 21 and 22, respectively, are circumferentially aligned at a common radius from the engine longitudinal centerline and define a substantially uninterrupted and aerodynamically smooth, straight cylindrical flowpath or fairing surface. Such a fairing surface reduces the leakage of airflow radially outwardly between vanes 14 and allows the smooth flow of gases in the axial direction.

As more particularly shown in FIG. 2, the removal of any individual vane 14 from the outlet guide vane row is simply accomplished by removing the two bolts 44 extending through the appropriate mounting fairing and tilting the vane assembly out. More specifically, in the case of removing a first mounting fairing and vane unit, vane 14c for example, the unit can be lowered radially from its position inasmuch as the tip 15 of vane 14 can slide radially in recess 41 of inner shroud 17. A second mounting fairing and vane unit, vane 14d for example, is individually removable after the spacers 42 are removed which allows the fairing and vane unit to be firstly rotated axially and secondly rotated or lifted radially up and out of the outlet guide vane row.

The use of elastomeric boots 39 and 40 results in a resilient or elastic mounting which provides substantially a simple support rather than a fixed support to the outer ends, i.e. tip and root, of vanes 14. This simple support type arrangement reduces aerodynamically induced vane stresses at the outer supported ends of the vane. The reduction of stress at the outer supported ends of the vanes 14 is a major consideration for the successful mounting of composite vanes of the type as above-described. Additionally, the use of elastomeric boots 39 and 40 inherently provides effective damping for any vibration of the vanes 14 that may occur. Furthermore, the resilient mounting of vanes 14 can reduce foreign object damage of the vanes 14 that may otherwise result.

Another embodiment of the present invention is shown in FIG. 4. A plurality of mounting fairings 45 secure the radially outer ends of the vanes 14 to the stator casing 12. Each mounting fairing 45 is generally similar in construction and material to the first mounting fairing 21 as shown in FIGS. 2 and 3. However, in this embodiment all the mounting fairings 45 have substantially the same dimensions and are disposed adjacent to each other without any radial overlap of adjacent flanges. As in the first embodiment, the boots 39 can be individually molded for accomodating any non-uniform angular orientation of the vanes 14 in the recesses 24.

It will be observed that without the overlapping of adjacent mounting fairings, two bolts 44 for each mounting fairing are required for mounting the vane 14 to the stator casing 12. This is in contrast to having one bolt 44 per vane as in the first embodiment. However, all the advantages and benefits otherwise resulting from the invention as described for the first embodiment are realizable.

While there has been described herein what is considered to be a preferred embodiment of the invention, other modifications will occur to those skilled in the art after having considered the present disclosure. For example, the mounting fairings 21 and 22 can each comprise a boss or a plurality of bosses 23 having a plurality of recesses 24 therein circumferentially spaced for receiving a plurality of vane roots. In this manner, vanes 14 can be mounted and assembled in groups which can simplify assembly and disassembly as well as improve the vibrational characteristics of the grouped vanes by increasing vibratory natural frequencies.

The mounting fairings can alternatively be designed for mounting the radially inner ends of the vanes 14 if desired.

The boots 39 and 40 can alternatively be open-ended bushings which are bonded in recesses 24 and 41 which recesses can comprise apertures extending through the bosses 23 and shroud 17, respectively. Additionally, the first and second flanges of the mounting fairings can comprise flanges arranged axially side-by-side for creating lap joints which overlap in an axial plane and being suitably joined.

Although the airfoil mounting assembly mounts outlet guide vanes in a gas turbine engine, the arrangement can be used for mounting any stator vanes to the stator casing in a gas turbine engine.

The airfoil mounting assembly can comprise a rotatable outer shroud for interconnecting the tips of rotating blades in an engine. In this embodiment, the mounting bolts 44 need only connect the first, or leading end, flange and the second, or trailing end, flange of adjacent mounting fairings and not be attached to the stator outer casing 12, so as to allow the rotor wheel and blades to freely rotate.

Accordingly, it is desired to secure by the appended claims all modifications falling within the true spirit and scope of the invention.

What is claimed is:

1. A mounting fairing for positioning an airfoil comprising;
   a central boss portion having oppositely extending first and second ends;
   a recess disposed in said first end for receiving an end of said airfoil; and
   integral first and second flanges extending outwardly from opposite sides of said boss portion, said flanges cooperating with said boss portion to define a substantially uninterrupted flow boundary surface for allowing the smooth flow of gases past said airfoil and said fairing;
   wherein said first and second flanges each includes an aperture for receiving a mounting bolt, and wherein each said aperture and said recess of said boss have radially extending axes which intersect at substantially a common point.

2. An assembly for mounting a plurality of circumferentially spaced and radially extending airfoils within an annular casing, each airfoil having radially extending first and second ends, said assembly comprising:
   a plurality of circumferentially arrayed mounting fairings each including a central boss having a radially extending recess in a radially facing surface thereof for receiving said first end of a respective one of said plurality of airfoils, and a first flange and a second flange integral with and extending circumferentially outwardly from opposite sides of said boss and positioned adjacently to second and first flanges, respectively, of adjacent mounting fairings; and
   fastening means for connecting said first and second flanges to said casing to form a substantially continuous annular member.

3. An assembly according to claim 2, wherein said radially facing surface of said boss is a radially inner surface and said first end of said respective one of said plurality of airfoils is a radially outer end.

4. An assembly according to claim 2, wherein said first and second flanges of adjacent mounting fairings overlap each other radially.

5. An assembly according to claim 2, wherein each of said mounting fairings further comprises receiving means disposed in said recess of said boss having an aperture for receiving said first end of said respective one of said plurality of airfoils.

6. An assembly according to claim 5, wherein said receiving means is elastomeric and is effective for resiliently supporting said first end and damping vibration of said respective one of said plurality of airfoils.

7. An assembly according to claim 5, wherein said receiving means comprises a boot bonded in said recess of said boss.

8. In an axial flow turbomachine having a cylindrical stator casing, a stator assembly comprising:
   an annular inner shroud having a plurality of circumferentially spaced recesses therein;
   a plurality of circumferentially spaced and radially extending stator vanes, each having plain inner and outer ends, said inner ends being secured in respective ones of said recesses in said inner shroud;
   a plurality of mounting fairings each including a central boss having a radially extending recess disposed in an inner surface thereof for receiving a respective outer end of one of said stator vanes, and integral first and second flanges extending circumferentially outwardly from opposite sides of said boss and positioned adjacently to second and first flanges, respectively, of adjacent mounting fairings; and
   fastening means for connecting said first and second flanges of adjacent mounting fairings to said stator casing.

9. The stator assembly according to claim 8, further comprising elastomeric receiving means bonded in said recesses of said inner shroud and said mounting fairings for receiving and resiliently supporting respective ends of said stator vanes.

* * * * *